United States Patent [19]

Cleary

[11] Patent Number: 4,534,900

[45] Date of Patent: Aug. 13, 1985

[54] PROCESS FOR SEPARATING FATTY ACIDS FROM UNSAPONIFIABLES

[75] Inventor: Michael T. Cleary, Elmhurst, Ill.

[73] Assignee: UOP Inc., Des Plaines, Ill.

[21] Appl. No.: 670,193

[22] Filed: Nov. 13, 1984

Related U.S. Application Data

[63] Continuation-in-part of Ser. No. 598,121, Apr. 9, 1984.

[51] Int. Cl.[3] .......... C09F 5/10; C11B 3/00

[52] U.S. Cl. .......... 260/428.5; 260/412; 260/412.8

[58] Field of Search .......... 260/412, 412.8, 428.5

[56] References Cited

U.S. PATENT DOCUMENTS

| | | | |
|---|---|---|---|
| 2,315,584 | 4/1943 | Borglin | 260/97.7 |
| 2,316,499 | 4/1943 | Borglin | 260/97.7 |
| 2,360,862 | 10/1944 | Morris et al. | 260/97.7 |
| 2,530,809 | 11/1950 | Christenson et al. | 260/97.7 |
| 2,530,810 | 11/1950 | Christenson et al. | 260/97.7 |
| 2,640,823 | 6/1953 | Gloyer et al. | 260/97.6 |
| 3,453,253 | 7/1969 | Brink | 260/97.6 |
| 3,803,114 | 4/1974 | Mitchell et al. | 260/97.6 |
| 3,965,085 | 6/1976 | Holmbom et al. | 260/97.6 |
| 4,404,145 | 9/1983 | Cleary et al. | 260/97.7 |
| 4,422,966 | 12/1983 | Amer | 260/97.6 |

OTHER PUBLICATIONS

Oksanen-Refining of Tall Oil Products by Column Liquid-Liquid Extraction, Tech. Res. Center of Finland, Jun. 6, 1963.

*Primary Examiner*—Herbert S. Cockeram
*Attorney, Agent, or Firm*—Thomas K. McBride; William H. Page, II; John G. Tolomei

[57] ABSTRACT

A process for separating a fatty acid from an unsaponifiable compound. A feedstream comprising the acid and unsaponifiable compound is contacted with an aqueous alcohol solvent which is selective for and absorbs the fatty acid. An extract stream comprising the fatty acid may then be recovered. The feedstock is best used in a diluent which is preferably a hydrocarbon.

6 Claims, No Drawings

PROCESS FOR SEPARATING FATTY ACIDS FROM UNSAPONIFIABLES

CROSS-REFERENCE TO RELATED APPLICATION

This application is a continuation-in-part of prior copending application Ser. No. 598,121 filed Apr. 9, 1984, now U.S. Pat. No. 4,495,094 issued Jan. 22, 1985, the entire contents of which are herein incorporated by reference.

BACKGROUND OF THE INVENTION

1. Field of the Invention

The field of art to which this invention pertains is the separation of fatty acids from unsaponifiables by a process employing liquid-liquid extraction.

2. Background Information

There is a wealth of patent art teaching the separation of unsaponifiables from tall oil soap using liquid-liquid extraction schemes. Examples of such schemes are as disclosed in U.S. Pat. Nos. 2,530,809 to Christenson et al., 2,530,810 to Christenson et al., 2,640,823 to Gloyer et al., 3,453,253 to Brink, 3,803,114 to Mitchell et al., 3,965,085 to Holmbom et al., 4,422,966 to Amer and a publication from the Technical Research Centre of Finland, entitled "Refining of Tall Oil Products by Column Liquid-Liquid Extraction." In these schemes unsaponifiables are extracted from aqueous solution with salts of fatty and rosin acids (soaps) by contacting the solutions with a solvent, such as a hydrocarbon or alcohol, in which the unsaponifiables are soluble and thereby removing the unsaponifiables from the salts. The fatty and rosin acid salts, according to these references, may then be converted to the acid forms to obtain tall oil.

With further regard to the above mentioned Mitchell et al. patent, it is taught (column 4) that emulsions formed when the attempt is made to extract unsaponifiables from aqueous solutions with a hydrocarbon solvent cause a serious problem which prevents successful completion of the extraction. This "problem" was solved by the use of certain alcohols which acted as de-emulsifiers. The teaching goes on to state that if water, soap skimmings, alcohol and hydrocarbon were shaken up together, the unsaponifiables would be extracted by the hydrocarbon and, when the mixture was allowed to stand, the components would quickly separate into a lower phase, consisting mainly of soap-water alcohol, and an upper phase consisting mainly of hydrocarbon and unsaponifiables.

My copending application Ser. No. 598,121, now U.S. Pat. No. 4,495,094, teaches the separation of fatty and rosin acids (not salts) from unsaponifiables by a liquid-liquid extraction technique. I have also discovered that mixtures comprised of unsaponifiables and fatty acids may be separated by the same liquid extraction technique.

SUMMARY OF THE INVENTION

Accordingly, primary objective of the present invention is to provide a process for the separation of fatty acids from admixture with unsaponifiable compounds.

In its broadest embodiment, the present invention comprises a process for separating a fatty acid from a feed mixture comprising the fatty acid and an unsaponifiable compound. The process comprises: (a) introducing the feed mixture into an extraction zone, and therein contacting the mixture with a solvent comprising an alcohol and water solution which is selective for absorbing the fatty acid; (b) removing a raffinate stream from the extraction zone which contains a higher concentration of unsaponifiable compound than the feed mixture; and (c) removing a solvent-rich extract stream from the extraction zone containing a higher concentration of the fatty acid, on a solvent free basis, than the feed mixture.

Other embodiments of the present invention encompass various details such as to specific compositions and proportions of feedstock and solvent, all of which are hereinafter disclosed in the following discussion of each of the facets of the present invention.

DESCRIPTION OF THE INVENTION

Before considering feed mixtures which can be charged to the process of this invention, brief reference is first made to the terminology and to the general production of fatty acids. The fatty acids are a large group of aliphatic monocarboxylic acids, many of which occur as glycerides (esters of glycerol) in natural fats and oils. Although the term "fatty acids" has been restricted by some to the saturated acids of the acetic acid series, both normal and branched chain, it is now generally used, and is so used herein, to include also related unsaturated acids, certain substituted acids, and even aliphatic acids containing alicyclic substituents. The naturally occurring fatty acids with a few exceptions are higher straight chain unsubstituted acids containing an even number of carbon atoms. The unsaturated fatty acids can be divided, on the basis of the number of double bonds in the hydrocarbon chain, into monoethanoid, diethanoid, triethanoid, etc. (or monoethylenic, etc.). Thus the term "unsaturated fatty acid" is a generic term for a fatty acid having at least one double bond, and the term "polyethanoid fatty acid" means a fatty acid having more than one double bond per molecule. Fatty acids are typically prepared from glyceride fats or oils by one of several "splitting" or hydrolytic processes. In all cases, the hydrolysis reaction may be summarized as the reaction of a fat or oil with water to yield fatty acids plus glycerol. In modern fatty acid plants this process is carried out by continuous high pressure, high temperature hydrolysis of the fat. Starting materials commonly used for the production of fatty acids include coconut oil, palm oil, inedible animal fats, and the commonly used vegetable oils, soybean oil, cottonseed oil and corn oil.

The source of feedstocks with which the present invention is primarily concerned is tall oil, a by-product of the wood pulp industry, usually recovered from pine wood "black liquor" of the sulfate or Kraft paper process. Tall oil contains about 50–60% fatty acids and about 34–40% rosin acids. The fatty acids include oleic, linoleic, palmitic and stearic acids. Rosin acids, such as abietic acid, are monocarboxylic acids having a molecular structure comprising carbon, hydrogen and oxygen with three fused six-membered carbon rings.

It is normal for tall oil to also contain a high neutrals or unsaponifiables content (the terms "neutrals" or "unsaponifiables" as used herein are intended to be interchangeable). The neutrals commonly found in tall oil have been quantitatively analyzed and more than 80 compounds found (Conner, A. H. and Rowe, J. W., JAOCS, 52, 334–8 (1975)). All of the compounds that comprised 1% or more of the neturals are identified below:

| Compound | % | Structure (Backbone) |
|---|---|---|
| Diterpene Hydrocarbons | 2.5 | $C_{20}H_{40}O$; Acyclic, Monocyclic, Bicyclic, and mostly Tricyclic |
| Resin Alcohols | 8.1 | 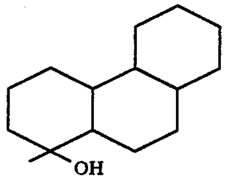 |
| Resin Aldehydes | 10.0 | 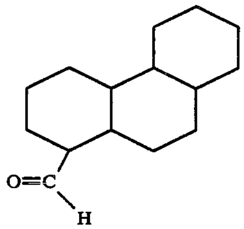 |
| Bicyclic Diterpene Alcohols | 16.8 | 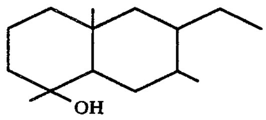 |
| Steroids | 32.4 | 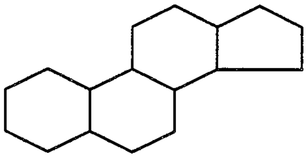 |
| Wax Alcohols | 6.1 | (long carbon chain) - OH |
| Stilbenes | 5.7 | 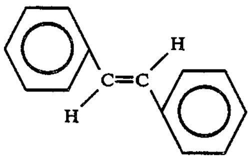 |
| Lubricating Oil | 4.4 | (long carbon chain) |

The four major components of crude tall oil, in order of increasing volatility, are: unsaponifiables, $C_{16}$ fatty acids, $C_{18}$ fatty acids and rosin acids. Distillation of these components produces tall oil heads or light ends which contain about 40–75% fatty acids, 26–60% neutrals and only minor quantities of rosin acids between 0.1 to 1.5%. The present invention achieves the separation of fatty acids from unsaponifiable compounds. Such a process is extremely beneficial in recovering fatty acids from tall oil heads.

Liquid-liquid extraction devices are well known to the art. Generally, the primary component of the device will comprise a vertical column containing internals such as perforated plates or packing, which ensure intimate contact of the two liquid phases. The heavier phase, such as the solvent phase of the present invention, is introduced at the top of the column, while the lighter phase, such as the feedstock of the present invention, is introduced at the bottom. The immiscible liquid phases pass each other in countercurrent flow and intimate admixture throughout the column whereby a major portion of the components of one phase, such as fatty acids in a hydrocarbon phase, may transfer to the phase, i.e. the solvent phase, in which they have a greater solubility. The solvent rich phase leaving the column is referred to as the extract stream, and the hydrocarbon phase, in which the unsaponifiables remain, is referred to as the raffinate stream. Solvent and diluent may be recovered from the extract and raffinate streams, respectively, for reuse in the system by conventional means such as distillation.

The quantification of the relative solubility of feed components A and N in a first phase as compared to a second phase is in accordance with the following formula:

$$\alpha = \frac{\left(\frac{\text{wt. \% } A}{\text{wt. \% } N}\right) P_1}{\left(\frac{\text{wt. \% } A}{\text{wt. \% } N}\right) P_2}$$

where $P_1$ and $P_2$ are the first and second phase, respectively, and A and N are acids and neutrals, respectively.

It should be emphasized at this point that the process of the present invention is in marked contradistinction to the processes of the above references, in that the latter require that the tall oil acid components undergo chemical change, i.e. saponification, before extraction is attempted. The present invention is based on the discovery that such chemical change is not necessary given the proper choice of solvent and, perhaps, feedstock diluent. Thus, extraction of the desired components can be accomplished directly by the process of the present invention, with avoidance of the additional steps of converting to a different chemical species and then back to the free acids.

The following non-limiting examples are presented to illustrate the process of the present invention and are not intended to unduly restrict the scope of the claims attached hereto.

EXAMPLE I

A laboratory scale countercurrent type liquid-liquid extraction column was operated, in a series of runs, to effect the extraction of fatty acids from tall oil heads using aqueous methanol as a solvent. The feedstock to the column comprised 3 grams of the tall oil heads dissolved in 50 ml of n-octane. Gas Chromatograph Analysis of the tall oil heads gave the following compositions: 27.7% neutrals, 64.2% fatty acids, 67% light acids and 1.2% rosin acids. The column effluent streams were analyzed in a chromatograph and acid/unsaponifiable ratio calculated from the chromatographic peak area ratios in the respective streams. The volume ratio of feed/extract streams was between 1 and 2, inclusive, in all cases.

The data obtained for each run, including calculated α values, with the water content of the solvent varied from run to run, is presented in the following Table I.

TABLE I

| Solvent Vol. % Water | (Acid/Neutral) Feed | Extract | Raff. | (α Acid/Unsaponifiables) Extract/Feed | Raff./Feed | Extract/Raff. |
|---|---|---|---|---|---|---|
| 2.8 | 4.161 | 156 | 1.8 | 37.4 | .431 | 86.7 |
| 5.0 | 3.87 | 623.4 | — | 161 | — | — |
| 6.3 | 4.161 | 49.8 | 2.442 | 11.98 | .587 | 20.4 |
| 7.7 | 4.161 | 26.4 | 2.403 | 6.35 | .578 | 10.99 |
| 7.9 | 4.161 | 59.2 | 2.25 | 14.2 | .542 | 26.31 |
| 11.1 | 4.161 | 490.3 | 2.653 | 117.8 | .638 | 184.8 |
| 12.5 | 4.161 | 1000 | 2.645 | 240 | .636 | 378.1 |
| 14 | 4.161 | 933 | 4 | 224.19 | .963 | 233 |
| 18.6 | 4.161 | 995.2 | 3.12 | 239 | .750 | 318.9 |
| 22.2 | 4.161 | 1000 | 3.018 | 240 | .725 | 331.3 |

It is clear from the data in Table I that the selectivity of the extract solvent rich stream for the fatty acids as compared to the unsaponifiables is very high as related to the other streams. It may also be observed that the general trend is that such selectivity increases with the water content of the solvent. The quantity of water in the solvent may therefore be adjusted to achieve the desired selectivity. It should be kept in mind, however, that as selectivity rises with water content, the capacity of the solvent to dissolve acids diminishes. Thus, the degree of selectivity desired must be weighed against the amount of solvent that would be required.

I claim as my invention:

1. A process for separating a fatty acid from a feed mixture comprising said fatty acid and an unsaponifiable compound, said process comprising:
   (a) introducing said feed mixture into an extraction zone, and therein contacting said mixture with a solvent comprising an alcohol and water solution which is selective for absorbing said fatty acid;
   (b) removing a raffinate stream from said extraction zone which contains a higher concentration of unsaponifiable compound than said feed mixture; and
   (c) removing a solvent-rich extract stream from said extraction zone containing a higher concentration of said fatty acid, on a solvent free basis, than said feed mixture.

2. The process of claim 1 wherein said alcohol comprises ethanol.

3. The process of claim 1 wherein said feed mixture includes a hydrocarbon diluent.

4. The process of claim 1 wherein said diluent comprises normal hexane or normal octane.

5. The process of claim 1 wherein said feed mixture comprises a tall oil head.

6. The process of claim 1 wherein the quantity of water in said solvent is adjusted to achieve the desired selectivity of said solvent for said fatty acid relative to said unsaponifiable compound.

* * * * *